United States Patent Office 3,517,700
Patented June 30, 1970

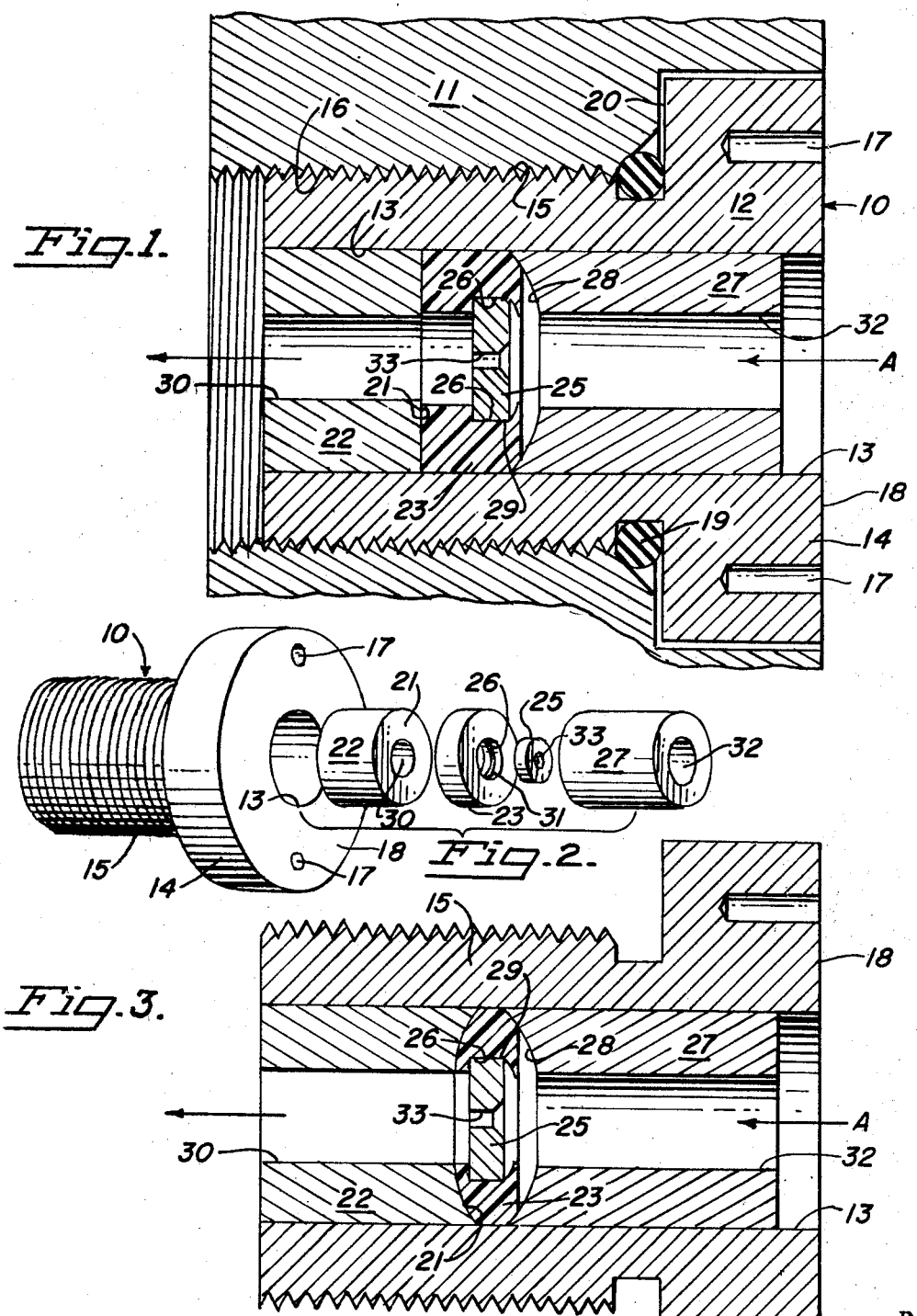

3,517,700
COMPENSATING ELEMENT FOR
HYDROSTATIC BEARINGS
Alan F. Williams, Palo Alto, and William T. Zee, South
San Francisco, Calif., assignors to Tydeman Machine
Works, Inc., Redwood City, Calif., a corporation of
California
Filed Dec. 23, 1968, Ser. No. 786,121
Int. Cl. F15d 1/02
U.S. Cl. 138—44
9 Claims

ABSTRACT OF THE DISCLOSURE

A compensating element for hydrostatic bearings includes an orifice formed in a semi-precious stone material which is mounted in a special retaining assembly with deformable material whereby leakage is eliminated at high pressures and the stone material is able to withstand mechanical and thermal shock while providing accurate, precise flow control for improved bearing performance.

BACKGROUND OF THE INVENTION

Hydrostatic bearings which are of the "sliding surface type bearing" as opposed to the rolling element or the so-called "anti-friction type bearing" are finding increasing application in the bearing field, especially in the machine tool area. While these types of bearings are relatively new, their outstanding performance features, such as high load capacity at all speeds, extremely low and predictable running friction and unlimited bearing life without deterioration are bringing them to the forefront in many areas, even though their initial cost exceeds other types of bearings.

In particular, hydrostatic bearings are really part of a complex system requiring external hydraulic circuitry, pumps and other components which cooperate with structures at the mating bearing surfaces which are supported by the bearing. Thus, the widespread employment of hydrostatic bearings has been slow because of the competitive disadvantage and the complexity of these types of bearings. Where the design parameters of a particular bearing require the outstanding features of these bearings, their higher cost is of lesser consequence and they are often employed.

A simple hydrostatic bearing system will include a pump, supply lines and a restrictor or compensating element controlling the flow of fluid to a recess in the bearing pad and a runner closely mating with the raised sill portion surrounding the recess of the pad. In operation, the pressurized fluid passing over the sill (i.e., leakage) helps support the runner, along with the pressurized fluid in the recess, on a fluid film so that the runner effectively floats above the pad without any metal to metal contact which accounts for the unlimited bearing life of such units. If the runner moves closer to the sill, the pressure within the recess will increase (up to pump pressure) acting to restore the runner to its original position. Alternatively, if the runner moves away from its mating sill area, the flow across the sill, will increase and the pressure within the recess will decrease due to the limited flow through the restrictor.

Obviously, the above description is an over-simplification and most hydrostatic bearings will involve numerous pads which may be circumferentially spaced in order to support a shaft on a dynamic fluid film around its whole circumference. In such a system, a large number of compensating elements must be used if a single source of supply is employed for the pressurized fluid. However, the above discussion does illustrate the importance of the restrictors and it can be appreciated that should one of these restrictors function improperly, the associated bearing pad may not provide the proper support in its runner thereby resulting in defective bearing operation.

Thus, one of the more important components in any hydrostatic bearing system is the restrictor or compensating element through which the pressurized fluid is supplied to the recess of the bearing pad. A compensating element is required to adjust or balance the flow so that the proper design leakage rate is achieved across the sill (between it and the runner) when the bearing is operating at an optimum configuration. Obviously, to make hydrostatic bearings more practical, it is desirable to limit this leakage and to increase the pressures to provide stiffer bearings. Thus, in order for such systems to operate properly, the restrictor or compensating element must provide the proper control over a small volume of high pressure fluid passing therethrough. Any defects in the compensating element which cause undesirable flow variations will seriously effect the bearing operation.

The three most common types of restrictors employed as compensating elements are capillary tubes (flow proportional to pressure drop), sharp edged orifices (flow proportional to the square root of the pressure drop) and flow control valves (flow constant).

In selecting the compensating element for a hydrostatic bearing system, many factors must be considered. Flow control valve compensators, wherein the flow through the unit is constant, are probably the most preferred and likewise, the most expensive. Some of the factors comparing the various characteristics of the three types of compensating elements currently available are listed below which is illustrative of the many variables involved.

COMPENSATING ELEMENT CONSIDERATIONS *

| Consideration | Capillary tube | Sharp edge orifice | Flow control valve |
|---|---|---|---|
| Initial Cost | 2 | 1 | 3 |
| Cost to fabricate and install | 2 | 3 | 1 |
| Space required | 2 | 1 | 3 |
| Reliability | 1 | 2 | 3 |
| Useful life | 1 | 2 | 3 |
| Commercially available | 2 | 3 | 1 |
| Tendency to clog | 1 | 2 | 3 |
| Serviceability | 2 | 1 | 3 |
| Adjustable | 3 | 2 | 1 |

* Rating of 1 is best or most desirable.

From the above table, it can be seen that the known types of sharp-edged orifices which are employed as compensating elements in hydrostatic bearings are not readily commercially available and are the most difficult to fabricate and install. In addition, their shorter service life and their tendency to clog, along with their lower reliability leaves much to be desired.

The instant invention overcomes the above problems involved in the use of sharp-edged orifices as compensating elements, or at least substantially minimizes them to a major degree, by employing semi-precious stone discs with accurately sized, smooth apertures as orifices in a special mounting assembly for fabricating superior compensating elements.

SUMMARY OF THE INVENTION

An improved fluid compensating element employing a flow control orifice includes an orifice disc formed of a semi-precious stone material having a sized aperture therein and mounting assembly for supporting said orifice disc in a fluid system operating at high pressures in a manner that it is safe from mechanical and thermal shock. The orifice disc itself is formed of a ruby disc or a disc of some similar semi-precious stone material, in which an accurately sized aperture has been centrally formed. This jewel disc is supported in a sleeve of deformable material which is supportingly compressed about the circumference of the jewel disc as well as between the disc and its supporting housing to prevent leakage at its outer edge and isolate it from thermal and mechanical shock without crushing the fragile jewel disc.

BRIEF DESCRIPTION OF THE DRAWING

The present invention will be more easily understood from the following detailed description of the preferred embodiment, when taken in conjunction with the attached drawings wherein:

FIG. 1 is a vertical section through a compensating element constructed according to this invention;

FIG. 2 is an exploded perspective of the principal components of the compensating element, show in FIG. 1; and FIG. 3 is a vertical section through a modified form of the compensating element, with parts broken away.

DESCRIPTION OF THE EMBODIMENT

In FIG. 1, the compensating element 10 of the invention is illustrated mounted in a receiver structure 11 forming part of the fluid control system of a hydrostatic bearing arrangement. The compensating element includes a housing 12 which has the appearance of a cap screw with a longitudinal axial bore 13 passing centrally therethrough. Its cap portion 14 is connected to a threaded tap portion 15 by which the housing can be simply mounted in the receiver structure having mating threads 16 by using a tool with pawls for engaging recesses 17 on the face 18 of the cap portion.

With the proper tool, the housing 12 can be threadedly mounted in the receiver structure 11, as illustrated in FIG. 1, with an O-ring 19 sealing compressed between the under side 20 of the cap portion and the adjacent receiver structure. Thus, any fluid flow across the receiver structure will be controlled by the configuration of the axial bore 13 in the housing.

This bore 13 can be tapered to facilitate a press fit of its cylindrical components which are received in the bore, or alternatively, the bore may be stepped (not shown) in order to provide an internal supporting structure for some of these components. In the simplified construction shown in FIG. 1, the seat 21 is formed by a cylindrical collar 22 which is pressed into bore 13 so that it is flush with one end of the housing 12. Next, a sleeve 23 of deformable material, preferably an elastomer material such as polytetrafluoroethylene, is inserted into bore 13 after a ruby or jewel disc 25 is placed in the stepped sleeve recess within the center of the sleeve. The assembled sleeve and disc are inserted so that the recess will be located remote from the seat 21, as illustrated in FIG. 1. Subsequently, a retaining cylinder 27 is pressed into the bore so that its concaved or spherically inwardly dished end portion 28 will engage the outer periphery of the sleeve in a manner which will cause it to deform inwardly as the sleeve is compressed axially against the seat the seat 21. This action will compress the elastomer against the peripheral surface 29 of the ruby or jewel disc 25 in a tight-sealing engagement and isolate the disc from the metal bore 13, while also forming a seal therebetween. The sleeve 23, usually of elastomer material, but alternatively can be constructed of a soft metal, is "necked down" on the jewel disc in a tight-sealing relationship and centrally supports the disc within the bore as indicated. In this manner the ruby or jewel disc is sufficiently isolated from the metal structures of the assembly, so that it is not subject to thermal or mechanical shock. Thus, the differences in the coefficients of expansion of the jewel disc and the adjacent metal bore will be absorbed in the deformable material, and will not damage the fragile jewel disc.

The only flow through the housing 12 will be through the aperture in the jewel disc 25, since the compression of sleeve 23 both radially and axially, as previously described will form a positive high pressure seal between the disc and the bore 13, thus the fluid flow will be controlled by the size of the aperture in the jewel disc.

FIG. 2 shows the compensating element 10 in an exploded arrangement wherein the cylindrical components assembled within the bore of the housing are shown in the order they would be sequentially assembled in bore 13. In the illustration, it can be seen that the bore 30 in the collar 22, the aperture 31 in sleeve 23 and the bore 32 in the retaining cylinder 27 are all considerably larger than the orifice opening 33 in the jewel disc 25. Thus, as previously indicated, the aperture in the jewel disc is the sole controlling passageway in the assembled compensating element.

FIG. 3 illustrates another embodiment of the invention wherein the seat 21 is dished inwardly so that it also radially compresses the deformable sleeve onto the jewel disc when the retaining cylinder urges it against this seat. However, the curvature of the modified seat is somewhat less extreme than that of the retaining cylinder since it is desired that the inner diameter of the collar be a backup support for the recessed portion in the sleeve which supports the disc. Since the flow through the compensating element is in the direction of arrows A, as illustrated in the drawings, this arrangement will insure that the jewel disc is not displaced by the hydraulic forces acting thereon. Normally, the bore 30 in the seat will be somewhat smaller than the outer diameter of the jewel disc whereby there will be a little overlap with the disc to support it. Obviously, if reverse flow through the housing is desired, the cylindrical components are assembled from the opposite end of the housing than illustrated in FIG. 2.

Since the jewel disc is fragile and normally a very small disc, the above arrangement provides a most convenient safe mounting. Further, discs with different sized orifice openings can be employed for adjusting the flow through the housing, which means that the housing itself is capable of use in fabricating compensating devices with different metered flow by merely changing the jewel discs.

The individual jewel discs 25 are formed of semi-precious stones, such as rubies, saphires, garnets and the like and a convenient source of the jewel discs are the cap and pallet bearing jewels which are made for fine quality watches. These disc-like jewel bearings have very smooth and accurately sized bores formed centrally therein and are commercially available with a large variation of hole sizes. Further, the outer diameter of the jewel discs are fairly standardized and, therefore, they make an excellent source of suitable jewel discs for the compensating element made according to this invention. Because these jewel bearings are manufactured to accurate tolerances and have a smooth aperture opening or hole, they are not subject to clogging as are the rough edged metal counterparts of a similar hole size. Further, these jewel discs are less subject to wear than the metal counterparts and the new compensating element construction can be expected to provide a long and trouble-free service.

Thus, through this invention, superior compensating elements are made available at a greatly reduced price since the jewel disc can be purchased at a lesser cost than manufacturing accurately sized openings in metal structures. In addition, the other advantages mentioned are also obtained.

Semi-precious stone material is normally defined as gem material having a hardness less than 8. Typical semi-precious stone materials are rubies, garnets, turquoise, sapphire, amethyst, jade and tourmaline.

What is claimed is:
1. A compensating element for employment in hydrostatic bearing systems comprising:
   a sharp edged orifice means formed of a disc of semi-precious stone material having an aperture centrally formed therein;
   a housing means having a bore therein for mounting said disc; and
   deformable sleeve means sealingly supporting said disc within such bore and isolating it from thermal and mechanical shock whereby any fluid flow through such bore is controlled by the aperture size in said disc.

2. The compensating element as defined in claim 1 wherein the hardness of the stone material is less than 8.

3. The compensating element as defined in claim 1 wherein the semi-precious stone material is selected from the group consisting of ruby, garnet, turquoise, sapphire, amethyst, jade and tourmaline.

4. The compensating element as defined in claim 1 wherein the deformable sleeve means is formed of an elastomer material and has a recess for receiving the disc therein.

5. The compensating element as defined in claim 4 wherein the bore includes a seat for receiving the deformable sleeve and cylindrical means received in such bore for compressing said sleeve axially against said seat and radially onto the periphery of said disc for sealingly supporting said disc in such bore.

6. The compensating element as defined in claim 5 wherein the cylindrical means includes a concave spherical face contacting the sleeve whereby said sleeve is inwardly directed against the disc as it is axially compressed against the seat.

7. The compensating element as defined in claim 6 wherein the seat has a concave spherical face contacting the sleeve whereby said sleeve is inwardly directed against the disc for improved support and sealing action.

8. The compensating element as defined in claim 1 wherein the housing includes mounting means whereby it can be removed from the system as a unit.

9. The compensating element as defined in claim 6 wherein the elastomer material is polytetrafluoroethylene.

No references cited.

EDGAR W. GEOGHEGAN, Primary Examiner